March 14, 1961    J. F. PRINCE    2,974,417
PRECISION MEASURING INSTRUMENT
Filed Sept. 27, 1957    3 Sheets-Sheet 1
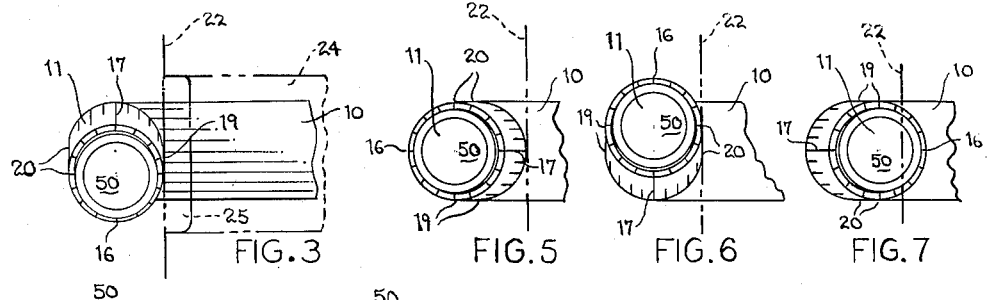
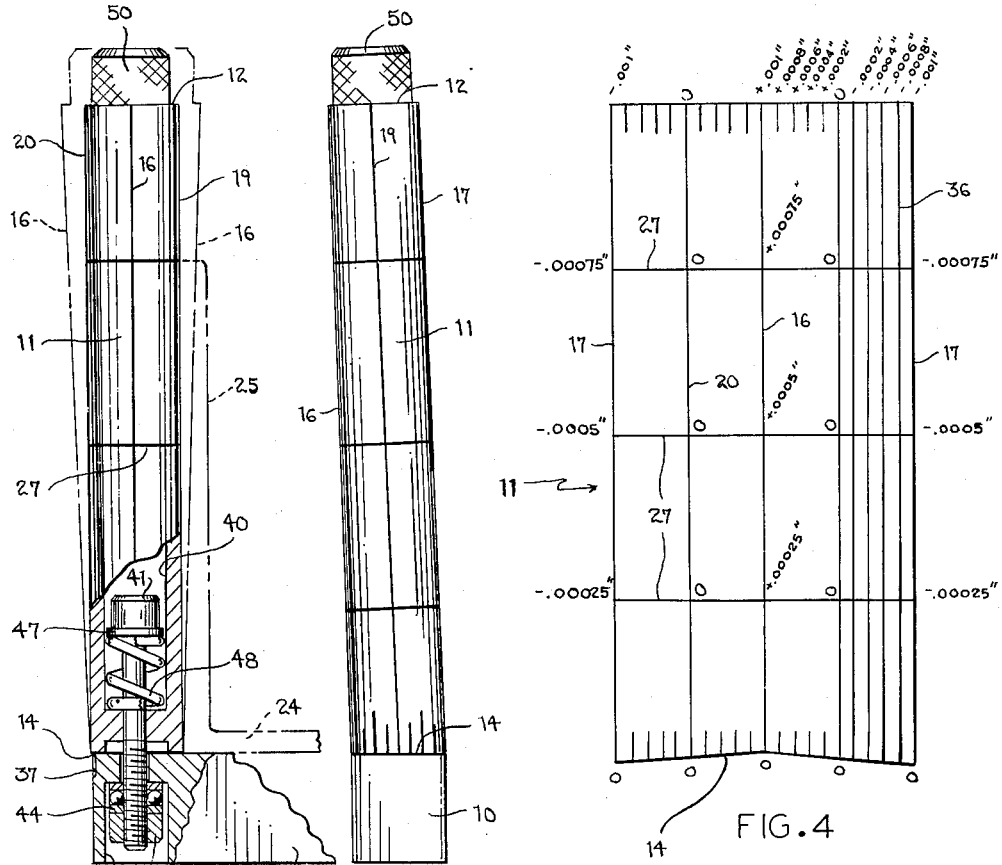
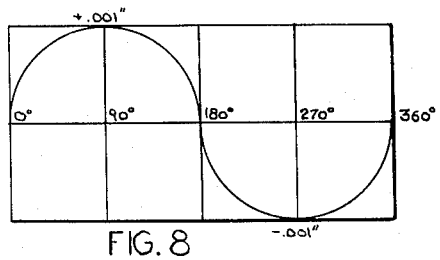
INVENTOR.
JOHN F. PRINCE
BY
*Richard von K. Bruns*
ATTORNEY March 14, 1961 J. F. PRINCE 2,974,417
PRECISION MEASURING INSTRUMENT
Filed Sept. 27, 1957 3 Sheets-Sheet 2

INVENTOR.
JOHN F. PRINCE
BY
Richard von K. Bruns
ATTORNEY

2,974,417
PRECISION MEASURING INSTRUMENT
John F. Prince, 233 Wilmore Place, Syracuse, N.Y., assignor of fifty percent to Joseph J. Prince, Jr., Syracuse, N. Y.

Filed Sept. 27, 1957, Ser. No. 686,793

6 Claims. (Cl. 33—174)

This application is a continuation-in-part of copending application Ser. No. 671,187, now abandoned, filed July 11, 1957, by the applicant. The invention disclosed herein relates generally to precision measuring instruments, and has particular reference to a novel toolmaker's square wherein minute deviations from an exact right angular relation can be measured with extreme accuracy. In accordance with the invention, the principal component of the novel square is an upstanding, graduated right cylinder the base of which has been ground off at a precise oblique angle so that rotation of the cylinder with its base resting upon a trued reference surface will cause the longitudinal surface elements of the cylinder to assume varying degrees of angular deviation from a plane perpendicular to the reference surface and the amount of the deviation at any point during the rotation is directly readable on the cylinder.

Through the years, the most commonly used toolmaker's square has been one having fixed legs disposed at right angles to one another, and when the square is applied to a work piece to test for squareness any deviation from a true right angular relation can be observed by the passage of light between the piece and a leg of the square. This test, however, does not tell the machinist or inspector the amount of the deviation, and a feeler guage or some other means must then be employed to measure the error so that it can be corrected. This method of testing and measuring is, of course, time consuming and inconvenient, and can be particularly burdensome when the work piece is relatively long and must be tested at regular intervals throughout its length.

In previous attempts to overcome the disadvantages of the fixed square, various direct reading instruments have been developed, and most of these employ an upstanding leg or blade which is pivotally secured to the base leg and also is mechanically connected to some type of indicator. When the square is applied to the work piece, the movable leg assumes the angular position of the upstanding portion of the piece and any deviation from the true perpendicular registers on the indicator. However, because of the mechanical connections between the movable blade and indicator, the motion multiplying means, and the like, these devices are subject to inaccuracies and once out of adjustment are often difficult to repair. Furthermore, the use of a number of different moving parts and mechanical connections necessitates greater skill and care in the manufacture and assembling of the instruments, and thus results in a substantial increase in the cost.

With the foregoing and other considerations in view, therefore, it may be stated that the primary object of the present invention is to provide a direct reading toolmaker's square or the like having an extremely simple construction, the square in its simplest form comprising but a single element which directly measures as well as indicates any error in the work piece being tested.

Another important object of the invention is to provide a direct reading toolmaker's square which is capable of being initially formed with a high degree of precision and thereafter cannot get out of order or lose its accuracy.

A further important object of the invention is to provide a direct reading toolmaker's square which has no mechanical connections or moving parts between the deviation sensing portion of the square and the direct reading portion thereof, the two being coextensive.

A still further important object of the invention is to provide a direct reading toolmaker's square capable of making extremely accurate measurements using either a decimal, metric or angular scale.

Still another important object of the invention is to provide a direct reading toolmaker's square which is efficient and practical in use and at the same time is strong and durable.

A more specific object of the invention is to provide a direct reading toolmaker's square wherein the deviation sensing and measuring element of the instrument is an upstanding, graduated right cylinder, the base of which has been ground off at a precise oblique angle.

Other objects and advantages of the invention will become apparent from the following detailed description thereof read in conjunction with the accompanying drawings which illustrate a representative embodiment of the invention for the purpose of disclosure.

In the drawings:

Figure 1 is a side elevation, partially in section, of a direct reading toolmaker's square embodying the invention, the base of the square being shown fragmentarily;

Figure 2 is a front elevation of the square shown in Figure 1;

Figure 3 is a top plan view of the square;

Figure 4 is a developed circumferential layout of a graduated cylinder employed in the square;

Figure 5 is a fragmentary top plan view of the square with the cylinder rotated clockwise 90° from the position shown in Figure 3;

Figure 6 is a fragmentary top plan view of the square with the cylinder rotated clockwise 180° from the position shown in Figure 3;

Figure 7 is a fragmentary top plan view of the square with the cylinder rotated clockwise 270° from the position shown in Figure 3;

Figure 8 is a graph showing amount of deviation measured against amount of angular rotation of the cylinder;

Figure 11:
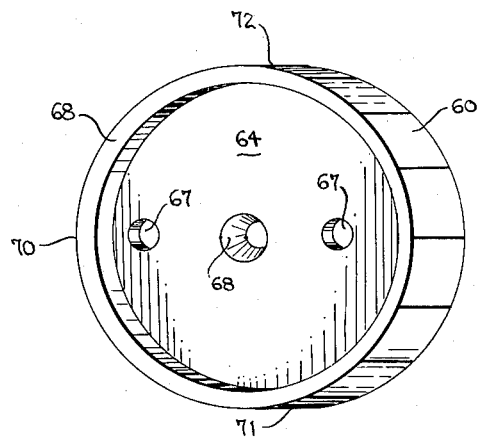
Figure 11 is a top plan view of the cylinder shown in Figure 10.

Having reference now to the drawings, wherein like reference numbers designate the same parts in each of the views, and with particular reference to Figures 1–4, the square is essentially comprised of a base member 10 and an upstanding cylinder 11 rotatably mounted on the base. The base is of sufficient size and weight to support the cylinder in upright position, and the top and bottom surfaces of the base are machined perfectly parallel and true. The cylinder 11 is also very accurately machined so that each surface element thereof is parallel to its axis and the plane of the upper end 12 is perpendicular to the axis. In accordance with the invention, however, the lower end or base 14 of the cylinder is not perpendicular to the axis but is obliquely disposed relative thereto, the base having been ground off at a precise angle in a manner to be presently explained.

Since the angularly offset lower end 14 of the cylinder 11 abuts against the machined upper surface of the base member 10, it will be apparent that the axis of the cylinder is at no time perpendicular to the base member but will generate an inverted conical surface as the cylinder is rotated relative to the base. It also will be understood that because of its obliquely formed base the cylinder will have a surface element of minimum length as at 16 and a surface element of maximum length as at 17, and these two elements will be exactly 180° apart, see Figure 2. Midway between the minimum and maximum length elements 16, 17 on the circumference of the cylinder are a pair of surface elements of equal length as at 19, 20, the length of each of these elements being exactly halfway between the lengths of elements 16, 17 (or equal to the length of the short element 16 plus one-half the difference in length between elements 16, 17). Elements 19, 20 are also diametrically opposed and exactly 90° from each of the elements 16, 17.

When the cylinder 11 is positioned on the base member 10 with the bottoms of its equal length elements 19, 20 in registration with the longitudinal center line of the base member, Figures 2 and 3, the element 19 will lie in a plane perpendicular to the upper and lower surfaces of the base member, which plane is indicated by the phantom line 22, Figure 3. Thus, even though element 19 is not itself perpendicular to the horizontal surfaces of the base member, the vertical plane 22 in which it lies is perpendicular thereto. Accordingly, if the horizontal leg 24 of the work piece being tested (shown in phantom lines in Figures 1 and 3) is positioned on the upper surface of the base member and the upstanding or vertical leg 25 thereof is positioned against the cylinder, perfect line contact of the cylinder element 19 with the leg 25 will indicate that there is exact right angular relation between the work piece legs at that point. The same would be true also if the cylinder 11 were rotated 180° so that element 20 were moved into contact with the workpiece, see Figure 6, the only difference in such case being that the cylinder would be angularly disposed to the right rather than left as viewed in Figure 2.

If neither of the elements 19, 20 (which may be indicated by graduated lines on the cylinder 11 as will appear hereinafter) makes line contact with the upstanding work piece leg 25, an observer in line with the plane 22 will be able to see light between the leg and cylinder and thus will know that the two surfaces of the work piece are not square with one another at the point of testing. Depending upon whether the light shows at the top or bottom of the cylinder, the observer will then rotate the cylinder 11 in one direction or the other until a surface element of the cylinder does make line contact with the work piece leg 25, in which case no light will show therebetween. At this point, the amount of error or deviation can be read directly on the cylinder as will be explained in detail below.

First, however, it should be pointed out that if the cylinder 11 is rotated clockwise as viewed in the plan view of Figure 3, the upper portion thereof will gradually tip or move away from the plane 22 until it reaches its point of maximum distance therefrom (indicated by the left hand phantom line position of Figure 1 and plan view of Figure 5) at which point the minimum length element 16 coincides with the longitudinal center line of the base 10 at the left end thereof. At this point, the cylinder will have been rotated through exactly 90°, rotation in this direction being necessary when the light shows at the bottom of the cylinder. Thereafter, continued rotation of the cylinder in the clockwise direction will cause the upper portion thereof to gradually tip or move back towards the plane 22 until the element 20 coincides therewith. At this point, the cylinder will have moved through another 90° and the bottom of element 19 will be in registry with the longitudinal center line of the base at the left end thereof (see Figure 6).

If the light is observed at the top of the cylinder while testing the work piece, and starting again with the cylinder in the position shown in Figures 1, 2 and 3, the cylinder must be rotated in the opposite or counter-clockwise direction as viewed in Figure 3 which will cause the upper portion thereof to gradually tip to the right or into the plane 22. Once again, the point of maximum deviation is reached after the cylinder has been rotated through exactly 90° at which time the maximum length element 17 thereof coincides with the longitudinal center line of the base at its left end as shown in Figure 7. If the error measured by the cylinder when it inclines to the left (Figure 5) is considered a plus error and the error measured when the cylinder inclines to the right (Figure 7) is considered a minus error, a plot of the amount of error or deviation measured against the angular amount of rotation of the cylinder will have the form of a sine curve with zero deviation at 0° and 180° and maximum plus and minus deviations respectively at 90° and 270°, see Figure 8.

In order to directly read the amount of deviation or error measured by the cylinder 11, the latter may be provided with longitudinal and circumferential graduation lines 27 on the surface thereof. To illustrate the manner in which graduation lines of this type are applied to the cylinder in proper relation to the oblique angle ground on the cylinder base, a specific example will now be described which has proved to be highly practical and accurate in actual shop use. It is not intended, however, that the scope of the invention be in any way restricted or limited by the dimensions given by way of this example. Referring to Figures 1–4, the cylinder 11 is initially machined so that it is a perfect right cylinder with each longitudinal surface element exactly parallel to its axis and its upper and lower ends exactly perpendicular to the axis. As so machined the cylinder of the example is 5″ high and ¾″ to 1″ in diameter.

It will be assumed now that the square is to measure a maximum error or deviation of plus or minus .001″. Before grinding the oblique angle at one end of the cylinder, it will be scribed or otherwise permanently marked with at least four longitudinally extending graduation lines spaced 90° apart and three equally spaced circumferential or horizontally extending graduation lines. The grinding is preferably carried out with the aid of a sine bar device such as the well known, commercially available Magne-Sine, the sine bar being schematically shown at 30 in Figure 9. The sine bar is mounted on a horizontally reciprocable surface grinder table 31 below a grinding wheel 32, and one side of the bar is elevated .001″ from the table which is the maximum error the cylinder is intended to measure. The right cylinder 11 is placed in upright position upon the sine bar 30 with two of its diametrically opposed longitudinal scribed lines in exact registry with the longitudinal center line of the sine bar and grinder table.

In the example described, the distance between centers on the sine bar is exactly 5″ and the cylinder is exactly 5″ high so that the acute right triangle ABC will be equal to the acute right triangle DEF since the sides of the triangles are respectively perpendicular to one another and the sides AC and DF thereof are equal in length. Accordingly, since side CB equals .001″, the amount that the right side of the sine bar has been elevated from the horizontal, corresponding side EF also equals .001″ or, in other words, the point F on the upper edge of the cylinder is tipped away from the perpendicular this amount. With the sine bar and cylinder so arranged, the grinder table is reciprocated horizontally so that the top of the cylinder is brought into engagement with the grinding wheel 32 which removes therefrom an amount of material corresponding to the cross hatched area indicated at 34.

Figure 9:
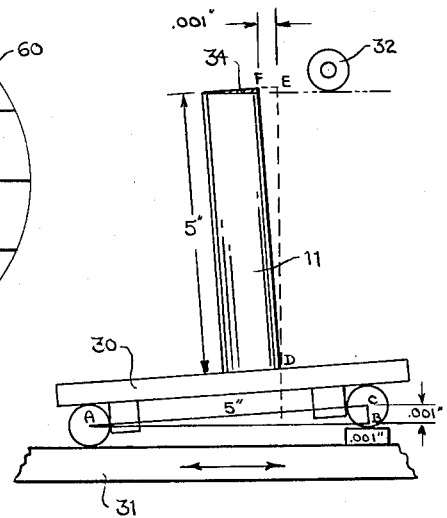
Figure 9 is a schematic illustration showing a sine bar method of accurately grinding the cylinder of the invention.

When the grinding has been completed it will be apparent that the ground surface is obliquely disposed with respect to the axis of the cylinder which is then turned upside down so that this surface becomes the cylinder base 14 previously described. Moreover, with the cylinder resting on this base as shown in the drawings, the upper edge thereof will be exactly .001" from the plane 22 in either of the phantom line positions shown in Figure 1, or as shown in Figures 5 and 7. Since the cylinder was mounted during the grinding operation on the sine bar with two of its diametrically opposed longitudinal scribed lines in registry with the longitudinal center line of the grinder table, the scribed line at the right side of the cylinder as seen in Figure 9 is the minimum length or shortest surface element 16 while the scribed line at the left side of the cylinder is the maximum length or longest element 17. The other two diametrically opposed scribed elements, on the other hand, were in a common plane perpendicular to the direction of reciprocable movement during the grinding and therefore are the two equal length surface elements 19, 20.

Referring now to the developed circumferential layout of the cylinder 11 shown in Figure 4, and in accordance with the previous description, the cylinder is marked +.001" at the top of the shortest surface element 16 and —.001" at the top of the longest surface element 17. Intermediate these diametrically opposed scribed lines are the equal length elements 19, 20 which are marked zero from bottom to top. Additional longitudinal element lines may be scribed intermediate the four primary lines, as is shown in the 90° sector at the right side of the layout only, and if there are four such lines the tops thereof will be marked —.0002", —.0004", —.0006" and —.0008" reading to the right from the zero mark at the top of element 19 to the —.001" mark at the top of element 17. The additional longitudinal element lines or graduations in the other sectors will be marked either plus or minus in the same increments, as is indicated on the drawing. With a cylinder 5" high, there are preferably three horizontal graduation lines between the top and bottom of the cylinder and these will divide the longitudinal lines into equal increments from zero at the bottom to the maximum reading at the top, as shown. For example, the longitudinal line 36 just to the left of the element 17 at the right hand side of the layout will be marked zero at the bottom of the cylinder, —.0002" at the first horizontal graduation from the bottom, —.0004" at the second horizontal graduation, and —.0006" at the third. The elements 19, 20 will, of course, read zero at each horizontal graduation line from bottom to top.

The base 10 of the square is provided at its left end, Figure 1, with a zero reference mark coinciding with the vertical center line of the base as indicated at 37. When, as shown in Figure 3, the element 19 makes line contact with the upstanding leg 25 of the work piece, the bottom of the diametrically opposed element 20 will be in registry with this reference mark and, since element 20 reads zero from bottom to top, the craftsman will know that the work is perfectly square. When, however, the cylinder must be rotated to the position shown in Figure 5 before the element 17 makes line contact with the work piece leg 25, the element 16 will be in registry with the reference mark and will indicate an error of +.001" at the top of the cylinder. Thus, if the work piece leg is 5" or more high, the craftsman will know that at the 5" height the leg is off +.001". In the work piece indicated in Figures 1 and 3, the leg 25 is less than 5" high, extending only to the third horizontal graduation on the cylinder. The craftsman therefore takes his reading at this point on the element 16 and finds that the error is +.00075" as indicated on the layout of Figure 4. If line contact is made with the work piece 25 before the cylinder has been rotated through a full 90° to the Figure 5 position, the error of course is less than .001" and can be read on the longitudinal element in registry with the reference mark, the reading being taken at the top of the cylinder if the work piece leg is 5" or more in height or at the closest lower graduation if the leg is less than 5" in height.

In the above described manner the square of the invention can be used to directly measure plus or minus error with extreme accuracy, and it will be understood that the angular relation of the parts shown in the drawings is greatly exaggerated for the purpose of illustration. The cylinder can be made with a greater or less height than 5" and the scale of course can be varied within reasonable limits. For example, another practical embodiment of the invention employs a cylinder 10" high capable of measuring a maximum error of .004" at the 10" height. It should also be pointed out that due to the oblique base of the cylinder, the distance on the shortest surface element 16, see Figure 4, between the base and first horizontal graduation line is slightly less than the distances between the other graduation lines on this element. This error, however, is so minute that there is no loss in accuracy, the error involved being less than the thickness of any of the scribed graduation lines. If desired, the cylinder 11 can also be marked to measure deviations in the work piece in terms of degrees, minutes and seconds of angular measurement, although the decimal inch scale is of course most commonly used in shop work.

In the embodiment of the invention shown in Figures 1–8, the cylinder 11 is formed with a bore 40 extending almost to the bottom thereof to decrease its weight. The cylinder is secured to the base member 10 by means of a bolt 41 which extends through the base of the cylinder into a vertical bore 42 in the bottom of the base member where it passes through a thrust bearing 44 and is secured by a nut 45. Within the cylinder bore 40, the head of the nut abuts against a washer 47, which in turn bears against a compression spring 48 positioned in the bottom of the bore. This compression spring and thrust bearing arrangement serves to hold the cylinder in close abutment with the upper surface of the base member while, at the same time, permitting rotation of the cylinder relative thereto. To assist in this rotation, a knurled finger knob 50 is inserted in the top of the cylinder. The obliquely ground base 14 of the cylinder is undercut as at 52 so that only a narrow annular rim or shoulder 54 is in engagement with the base member thereby reducing the area of the contacting surfaces. The cylinder is also mounted on the base so that it will have a slight overhang with respect to the left end thereof, Figure 1, whereby the base will not interfere with the accuracy of the measurement.

Figure 10:
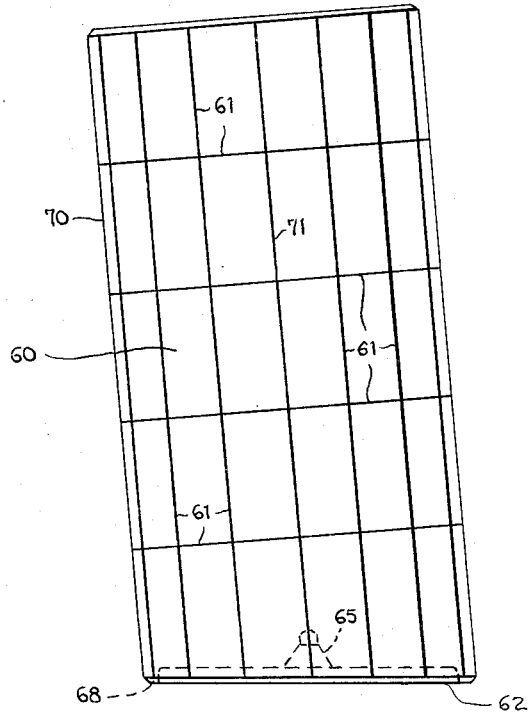
Figure 10 is a side elevation of the upstanding cylinder of the square as used without a base member.

In Figures 10 and 11 of the drawings the square of the invention is shown without the base member 10. Thus, in its simplest form, the square may be comprised of only the graduated cylinder 60 formed with longitudinal and horizontal graduation lines 61 and an obliquely ground base 62 exactly as described hereinabove. The cylinder may be a solid piece or it may be a hollow tube end, in the latter case, it is initially machined upon a mandrel and accurately ground between centers. As shown in the drawings, the cylinder is provided with a solid central portion 64 having centers 65 for machining, and diametrically opposed dowel holes 67. Both the base 62 and top of the cylinder are undercut to form annular contacting rims or shoulders 68 of reduced area.

The cylinder 60 may be considerably larger both in height and diameter than the cylinder 11 for use in connection with specialized work, but it can be graduated and marked for direct reading in exactly the same manner. In using the cylinder, however, a blue chalk-like substance is preferably used in testing for error rather than a strong light. This substance, which is in common use in machine shops, is spread evenly upon the upstanding work piece surface being tested and the cylinder is then positioned in upright position against the surface and rotated until a chalk mark appears on the cylinder in a continuous line from top to bottom. This indicates line contact between the cylinder and work piece at that point, and the reading can then be taken directly from the cylinder. Thus, as in the case of the cylinder 11, if the chalk line coincides with the minimum length element 70 on the cylinder, Figure 10, the error is read at the top of this line and is the maximum error measurable. Or, if the chalk mark coincides with one of the equal length elements 71, 72 spaced 90° from element 70 the reading is zero and the work piece is therefore perfectly square at the point tested.

Figure 12:
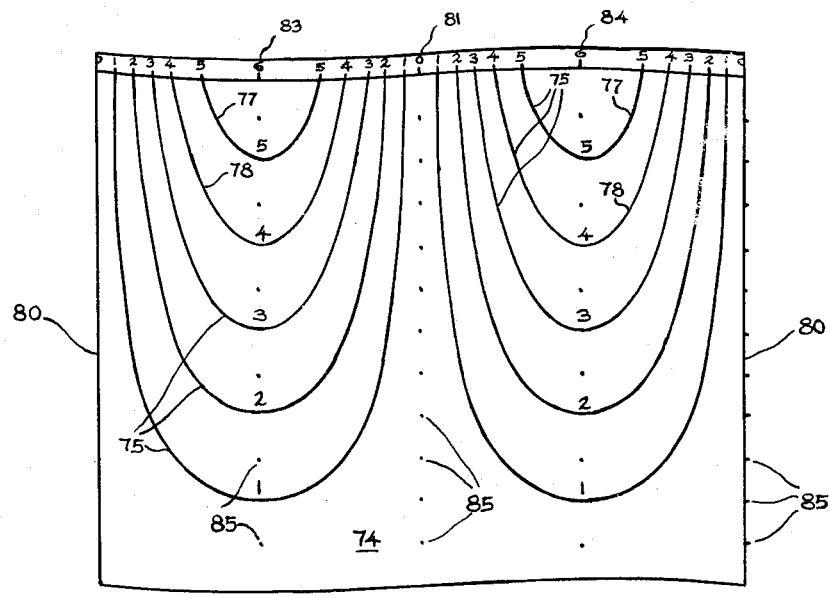
Figure 12 is a developed circumferential layout of a graduated cylinder having an alternative form of graduation markings.
Figure 13:
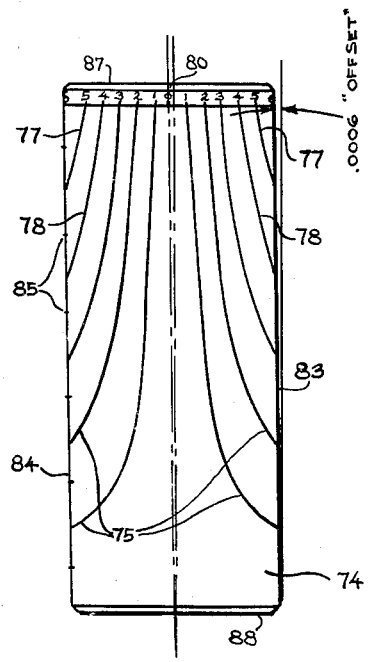
Figure 13 is a side elevation of a cylinder with graduation markings as shown in Figure 12.

Figures 12 and 13 illustrate a cylinder 74 embodying the invention which is provided with an alternative form of graduation markings. In this modification, the graduation lines 75 are curvilinear or arcuate in form and are plotted by means of angular and linear coordinates on the cylindrical surface. The angular and linear coordinates for each arcuate graduation line are derived from trigonometric formulas in such a manner that every point on the line measures the same amount of deviation from the perpendicular or, stated in another way, if each point on the line were projected vertically to the plane of the obliquely disposed base of the cylinder, the locus of the projected points would be an arc concentric with the base, which is to say that each of such projected points would be spaced the same radial distance from the base. For a graduated cylinder that is used without a base, as shown in Figures 10 and 11, this type of graduation marking enables even greater accuracy in taking a direct reading from the instrument than do the longitudinal and circumferential graduation lines previously described. In the embodiment shown, the cylinder is preferably 6″ in height and measures a maximum deviation of ±.0006″, or .0001″ per inch of height (the readings being shown as integers on the cylinder for space considerations). Accordingly, it will be seen that when the cylinder makes line contact with a shorter work piece being tested, if the upper end of the work piece contacts any point along the .0005″ graduation line 77, an .0005″ error will be indicated in the work piece, similarly, contact of the upper end of the work piece with any point along the .0004″ graduation line 78 indicates .0004″ error, and so on. Other embodiments can be made to measure a maximum deviation of ±.0012″ (.0002″ per inch of height), a maximum deviation of ±.0018″ (.0003″ per inch of height) and so forth, or any special scale may be used.

The longitudinal elements 80, 81 along which the cylinder measures zero deviation and the longitudinal elements 83, 84 along which the cylinder measures maximum plus or minus deviation may be indicated in each case by a series of longitudinally extending dots 85 spaced at ½″ intervals as shown. Similarly, the graduation lines 75 may be dash or dotted lines rather than solid lines as shown. In this embodiment, also, the top 87 of the cylinder can, if desired, be formed parallel to the obliquely disposed base 88 thereof without in any way altering the fundamental principle of operation of the cylinder and provides a means by which the cylinder is self-checking. Thus, a reading at any point on one quarter or quadrant of the cylinder can be checked by obtaining an identical reading at the corresponding point on the next adjacent quarter or quadrant of the cylinder.

From the foregoing description, it will be apparent that the invention disclosed herein provides a novel and highly useful direct reading square which enables extremely accurate measurement of error or deviation in a work piece with the minimum possible structure. The simplicity of this structure, moreover, insures that once accurately formed, the square will retain its accuracy and not be subject to mechanical error.

The invention may be embodied in other specific forms without departing from the spirit or essential characteristics thereof. The embodiments disclosed are therefore to be considered in all respects as illustrative and not restrictive, the scope of the invention being indicated by the appended claims:

What is claimed is:

1. A direct reading toolmaker's square comprising a base member having horizontal upper and lower surfaces in parallel relation to one another, and a cylindrical body formed with its upper end perpendicular to the longitudinal axis of the body and its lower end obliquely disposed with respect to said axis, said cylindrical body being rotatably mounted in upright position on said base member adjacent one end thereof with its obliquely disposed lower end abutting against the base member upper surface so that the longitudinal axis of the body generates an inverted conical surface when the body is rotated relative to the base member, said member being of sufficient size and weight to maintain said body in upright position, said body being formed with permanently inscribed circumferential and longitudinal graduation markings on the cylindrical periphery thereof for direct measurement of deviations from an exact right angular relation when said body is rotated in contiguous relation to an upstanding member being tested for perpendicularity with respect to the horizontal surfaces of said base member, said graduation markings permitting a direct reading to be taken on said body when a surface element thereof makes line contact with said upstanding member during rotation of the body.

2. A direct reading toolmaker's square comprising a base member having horizontal upper and lower surfaces in parallel relation to one another, and a cylindrical body each surface element of which is parallel to the longitudinal axis of the body, the top of said body being perpendicular to said axis and the bottom thereof being obliquely disposed with respect to the axis, said body having a maximum length and a minimum length surface element in diametrically opposed relation to one another due to the obliquely disposed bottom thereof, said body also having a pair of diametrically opposed surface elements of equal length spaced 90° from said maximum and minimum length elements, said body being formed with permanently inscribed longitudinal graduation lines coinciding with said maximum, minimum and equal length elements and additional longitudinal graduation lines at equally spaced intervals between said elements, said cylindrical body being rotatably mounted in upright position on said base member adjacent one end thereof with its obliquely disposed bottom in abutment with the horizontal reference surface of the base member so that the longitudinal axis of the body generates an inverted conical surface when the body is rotated relative to the base member, said member being formed with a zero reference mark adjacent the bottom of said body, said longitudinal graduation lines being adapted to directly measure deviations from an exact right angular relation between the legs of an angle work piece posiitoned with one leg on the horizontal reference surface of the base member and the other leg in upstanding contiguous relation to said cylindrical body, said body being rotated on said base member until a surface element thereof makes line contact with the upstanding work piece leg at which time any deviation from an exact right angular relation between the legs is readable on the longitudinal graduation line of the body in registry with said base member zero reference mark.

3. Structure as defined in claim 2 wherein said cylindrical body is secured to said base member by means including a spring member and thrust bearing to resiliently hold the bottom of the body in contact with the horizontal reference surface of the base member.

4. A direct reading toolmaker's square comprising an upstanding cylindrical body the surface elements of which are parallel to one another and to the longitudinal axis of the body, the base of said body being obliquely disposed with respect to the longitudinal axis of the body, said body having on the cylindrical surface thereof permanently inscribed markings forming a series of arcuate graduation lines for direct measurement of deviations from an exact right angular relation when the body is rotated with its obliquely disposed base on a perfectly flat reference surface and its cylindrical surface contiguous with a shorter work piece being tested for perpendicularlity with respect to the reference surface, said arcuate graduation lines being arranged on said body so that in any one of the lines every point on the line measures the same amount of deviation from the perpendicular and whereby if each point on the line were projected vertically to the plane of the base the locus of the projected points would be an arc concentric with the base, said arcuate graduation lines permitting a direct reading to be taken on said body when a surface element thereof makes lines contact with said work piece.

5. A direct reading toolmaker's square comprising an upstanding unitary cylindrical body the surface elements of which are parallel to one another and to the longitudinal axis of the body, said body having a height equal to at least twice the diameter thereof, the base of said body lying in a plane angularly offset a small predetermined amount from a plane perpendicular to the longitudinal axis of the body, said body having on the cylindrical surface thereof permanently inscribed markings forming a series of arcuate graduation lines for direct measurement of deviations from an exact right angular relation when the body is rotated with its angularly offset base on a perfectly flat reference surface and its cylindrical surface contiguous with a shorter work piece that is being tested for perpendicularity with respect to the reference surface, said arcuate graduation lines being arranged with respect to the angularly offset base of said body so that in any one of the lines every point on the line measures the same amount of deviation from the perpendicular and whereby if each point on the line were projected vertically to the plane of the base each of the projected points would be spaced the same distance from the base, line contact between said work piece and a surface element of said body permitting a direct reading of any deviation in the work piece to be taken from an arcuate graduation line where the upper end of the work piece touches the body.

6. A direct reading toolmaker's square comprising an upstanding unitary cylindrical body the surface elements of which are parallel to one another and to the longitudinal axis of the body, said body having a height equal to at least twice the diameter thereof, the top of said body being perpendicular to the longitudinal axis and surface elements of the body, the base of said body lying in a plane angularly offset a small predetermined amount from a plane perpendicular to the longitudinal axis, said body having a minimum length and a maximum length surface element in diametrically opposed relation to one another due to said offset base, said body also having a pair of diametrically opposed surface elements of equal length spaced 90° from said minimum and maximum length elements, said body having on the cylindrical surface thereof permanently inscribed markings forming a series of arcuate graduation lines for direct measurement of deviations from an exact right angular relation when the body is rotated with its angularly offset base on a perfectly flat reference surface and its cylindrical surface contiguous with a shorter work piece that is being tested for perpendicularity with respect to the reference surface, said arcuate graduation lines being symmetrically disposed with respect to said minimum and maximum length surface elements in such a manner that in any one of said lines every point on the line measures the same amount of deviation from the perpendicular and whereby if each point on the line were projected vertically to the plane of the base each of the projected points would be spaced the same distance from the base, line contact between said work piece and either of said equal length elements indicating a true perpendicular relation, and line contact between said work piece and any other surface element of said body indicating that the work piece is not perpendicular to the reference surface and permitting a direct reading of the deviation to be taken on said body where the upper end of the work piece touches an arcuate graduation line.

References Cited in the file of this patent

UNITED STATES PATENTS

| | | |
|---|---|---|
| 375,011 | Shaw | Dec. 20, 1887 |
| 1,232,613 | Scheeder | July 10, 1917 |
| 2,379,048 | Thomas | June 26, 1945 |
| 2,423,164 | Williams | July 1, 1947 |
| 2,430,613 | Hodge | Nov. 11, 1947 |
| 2,913,830 | Schroter | Nov. 24, 1959 |

FOREIGN PATENTS

| | | |
|---|---|---|
| 252,955 | Switzerland | Oct. 1, 1948 |